United States Patent [19]

Rhodes et al.

[11] 4,318,995

[45] Mar. 9, 1982

[54] METHOD OF PREPARING LIGHTLY DOPED CERAMIC MATERIALS

[75] Inventors: Warren W. Rhodes, Raritan; Man F. Yan, Berkeley Heights, both of N.J.

[73] Assignee: Bell Telephone Laboratories, Incorporated, Murray Hill, N.J.

[21] Appl. No.: 144,172

[22] Filed: Apr. 25, 1980

[51] Int. Cl.³ .................... C04B 35/00; C04B 35/44; C04B 35/46
[52] U.S. Cl. ..................................... 501/1; 104/300; 252/520; 252/521; 423/593; 501/135; 501/137; 501/153
[58] Field of Search .................. 106/73.31, 300, 39.5, 106/73.3; 423/593; 264/15, 65; 252/521

[56] References Cited

U.S. PATENT DOCUMENTS

| | | | |
|---|---|---|---|
| 3,528,919 | 9/1970 | McNamara et al. | 423/593 X |
| 3,549,315 | 12/1970 | Lester et al. | 106/73.3 X |
| 3,663,284 | 5/1972 | Stancioff | 106/300 |
| 3,938,064 | 2/1976 | O'Bryan et al. | 252/63.2 X |
| 3,983,077 | 9/1976 | Fuller et al. | 252/521 |
| 4,173,485 | 11/1979 | Woditsch et al. | 106/299 X |

FOREIGN PATENT DOCUMENTS 755860 8/1956 United Kingdom.
1282307 7/1972 United Kingdom.

OTHER PUBLICATIONS

Japanese J. of Applied Physics 10, pp. 736–746, Jun. 1971.
Neorganicheskie Materialy, 11, pp. 1233–1236 (1975) "Preparation of $Nb_2O_5$–Doped Semiconductive $TiO_2$".
Spray Drying, Second Ed. (1976) K. Masters, pp. 11–31 and 516–519, John Wiley & Sons NYC.

*Primary Examiner*—Helen M. McCarthy
*Attorney, Agent, or Firm*—Richard D. Laumann

[57] ABSTRACT

A method of preparing lightly doped ceramic materials which forms a slurry of the ceramic material with additives in solution, precipitates the additives and spray dries the slurry with the additive precipitates is described.

13 Claims, No Drawings

METHOD OF PREPARING LIGHTLY DOPED CERAMIC MATERIALS

TECHNICAL FIELD

This invention relates to a method of preparing lightly doped ceramic materials.

BACKGROUND OF THE INVENTION

Many ceramic materials play an important role in modern technology. One example, ferrite materials are used in such diverse applications as inductor cores for filters, high-frequency transformer cores, magnetic memory cores, magnetic recording tapes, magnetic recording heads, and magnets. As another example, $\beta$-alumina is used as a solid ionic conductor, and barium titanates ceramics are used extensively as capacitors.

Considerable effort has been expended in developing techniques to prepare various classes of ceramic materials with desired properties. A method that has applicability to a wide range of ceramic materials uses solid state reactions, at high temperatures, between the oxides or carbonates of the cation constituents in the ceramics. The method typically mixes very fine particles of the cation oxides or carbonates, and then calcines, mills, granulates, presses and sinters the composition. The milling step is frequently done in a slurry of the ceramic material and is often followed by spray drying of the ceramic slurry.

While there are many variations in the processing sequence just described, most variations, however, include both calcining and ball milling steps. The ball milling step is generally required because of a desire to thoroughly mix the constituents of the ceramic material to obtain a homogeneous ceramic composition. The desire for a homogeneous composition is even greater for those compositions in which the essential properties depend upon additives or dopants which are added to the ceramic in relatively small amounts. Such ceramics will be referred to as lightly doped and the additives will generally constitute 10 weight percent or less of the total ceramic. A homogeneous composition is desired for such material because aggregations of additives, if present in relatively small amount, may adversely alter material properties.

Such lightly doped ceramics are of commercial interest today. For example, $Al_2O_3$, lightly doped with magnesium, typically in an amount of approximately 0.3 percent, is useful as an arc chamber in high-temperature sodium-vapor lamps. In this ceramic, the magnesium additive promotes densification in alumina. As a further example, metal oxides having small amounts of selected additives have been shown to possess non-ohmic properties that make them useful in varistor devices. Zinc oxide with additives such as bismuth, cobalt, manganese, chromium, antimony; and titanium dioxide with additives selected from the elements of Groups IIA and VB of the Periodic Table are of particular interest for varistor applications.

While the conventional method does produce ceramics having desirable properties, it is undesirable because of its time consuming, typically several days, nature. The conventional method, which requires calcining is not only time consuming, but the calcining step may introduce contaminants from either the boat or oven lining which adversely alter material properties.

SUMMARY OF THE INVENTION

We have found that a ceramic material with at least one additive may be prepared by a method that forms a slurry of the ceramic powder in an aqueous solution of the at least one additive, precipitates the said at least one additive, and then spray dries the slurry with precipitates. If desired, a dispersant may be added to prevent agglomeration of solids in the slurry. Ammonium citrate in an amount of approximately 0.15 weight percent of the slurry has been found to be an effective dispersant. The method eliminates the usually practiced calcining and ball milling steps. The method may be advantageously practiced with additives that form 10 weight percent or less of the total ceramic material. After spray drying, the flowable ceramic material which results may be pressed and then sintered. In one preferred embodiment, the ceramic material is $TiO_2$ and the at least one additive is selected from the group consisting of the elements of Groups IIA and VB of the Periodic Table. The additives are conveniently put into solution as either nitrates or oxalates and are conveniently precipitated by adding ammonium sulfate or hydroxide. In one especially preferred embodiment, the additives are niobium and barium. Ammonium sulfate and ammonium hydroxide are added to a solution of barium nitrate and niobium oxalate to precipitate barium sulfate and either niobium hydroxide or niobium oxide, respectively. This corresponds to amounts less than 2.3 and 1.7 weight percent, respectively. The slurry with additive precipitates is spray dried, pressed and sintered. The niobium and barium are present in amounts less than 2 and 1 mole percents of the final ceramic composition, respectively.

DETAILED DESCRIPTION

The method of this invention will be described with respect to a ceramic material of $TiO_2$ and at least one additive selected from the group consisting of the elements of Group IIA of the Periodic Table. The term Group IIA means the elements Be, Mg, Ca, Sr and Ba. This additive is present in an amount greater than 0.0 mole percent and generally less than approximately 1.0 mole percent and gives the $TiO_2$ varistor, i.e., non-ohmic, characteristics. If an increase in electrical conductivity of the $TiO_2$ with a barium additive is desired, a second additive is included in the composition. The said second additive is selected from the group consisting of the elements of Group VB of the Periodic Table and is present in an amount greater than 0.0 mole percent and generally less than approximately 5.0 mole percent. The Group IIA and Group VB additives are present in amounts generally less than 1.0 and 5.0 mole percents, respectively, because greater amounts may lead to formation of unwanted second phases. The term Group VB means the elements V, Nb and Ta. The Group IIA additives are present in amounts generally less than approximately 0.1, 0.3, 0.5, 1.1, and 1.7 weight percent for Be, Mg, Ca, Sr, and Ba, respectively. The Group VB additives are present in amounts generally less than approximately 3.2, 5.8, and 10 weight percent for V, Nb and Ta, respectively. After the method has been described and understood with respect to these compositions by those skilled in the art, methods of preparing other ceramic materials having small amounts of an additive according to this invention will be apparent to those working in the art. The total additive content of the composition is desirably less than approximately 10 weight percent of the total composition. A larger additive content may be used, but problems arising from lack of homogeneity are less important than they are when the additive content is smaller.

Anatase $TiO_2$ powder is mixed into an aqueous solution of barium nitrate and niobium oxalate. Commercially available reagent grade chemicals have been found satisfactory. The solution is then mixed in a blender until it is homogeneous. A period of 30 minutes is usually sufficient. Barium sulfate is then precipitated by the addition of ammonium sulfate and either niobium hydroxide or niobium oxide is precipitated by the addition of ammonium hydroxide. The precipitating agent should be added in an amount sufficient to precipitate all of the additives present. The $TiO_2$ slurry with the additive precipitates is then blended for a time, typically 15 minutes, sufficient to thoroughly mix the slurry. The slurry is then desirably mixed with a binder such as poly(vinyl alcohol), commonly referred to as PVA, and a dispersant such as ammonium citrate. The dispersant is present in an amount that will depend upon the particular dispersant and ceramic materials being used. For ammonium citrate and $TiO_2$, the amount of ammonium citrate is desirably approximately 0.15 weight percent of the solid in the slurry.

Any soluble salt of barium and niobium may be used. Other precipitating agents, such as sulfuric acid, may also be used to precipitate barium sulfate and the niobium additive.

The slurry with additive precipitates is then spray dried by conventional and well known techniques such as those described in *Spray-Drying*, Leonard Hill Books, London, 1972. After spray drying, the resulting ceramic powder, if desired, is pressed and then sintered at a temperature between approximately 1350 and 1440 degrees C. for a time between 2 and 16 hours. The sintering atmosphere has been found to have an effect upon both the nonlinear current-voltage characteristics and the resistivity of the material.

It is believed that the method of this invention, insofar as it depends upon the sintering atmosphere and cooling rate for the production of varistor characteristics, will be better understood if an empirical model describing the general features of nonohmic devices, commonly referred to as varistors is first briefly discussed.

As is well known, ceramic materials have a granular structure. It is hypothesized by this empirical model that the contributions to the resistivity of the ceramic material by the grain boundaries and the grains may be separated. At low current levels, it is assumed by the model that the voltage is too low for electrons to tunnel through the energy barrier at the grain boundaries. In the low voltage region, the grain boundary resistivity is much higher than the grain resistivity. At high current levels, however, it is further assumed by the model that the voltage is sufficiently high to permit the electrons to tunnel through the energy barriers at the grain boundaries. In the high voltage region, grain boundary resistivity is small with respect to the grain resistivity. Although both limiting regions may have linear-current voltage characteristics, in the transition region from the high resistivity at low currents to the low resistivity at high currents, there is a nonlinearity in the voltage-current characteristics. This nonlinearity is conventionally represented by the expression $I = KV^\alpha$ with values of $\alpha$ that are greater than one. The nonlinear region provides the typical range of working voltages for varistor devices made according to this invention.

The value of alpha increases as the oxygen partial pressure increases from $10^{-5}$ to 1 atmospheres. An oxygen partial pressure equivalent to that found in the ambient atmosphere is required to give an alpha value greater than approximately 3 for $TiO_2$ with 0.5 percent niobium and 0.2 percent barium. This corresponds to approximately 0.6 and 0.3 weight percent niobium and barium, respectively. It is believed that higher oxygen partial pressures in general yield higher $\alpha$ values because of greater grain boundary oxidation and barium segregation at grain boundaries. However, as the oxygen partial pressure in the sintering atmosphere increases, the resistivity also increases. For example, samples sintered in an oxygen atmosphere have a resistivity approximately $10^3$ times larger than samples sintered in a nitrogen atmosphere. It is believed that this happens because oxygen vacancies and titanium interstitials are produced in an inert and reducing atmosphere. These defects act as donors and increase the electronic concentration and thus the conductivity.

A cooling rate between 100 and 10,000 degrees C. per hour after sintering has been found to yield good results. If cooling is too slow, the additive will segregate and form a second phase. If cooling is too rapid, no segregation will occur. This rate has been found adequate to permit grain boundary segregation.

Devices using $TiO_2$ having at least one additive selected from the group consisting of the elements of Group IIA of the Periodic Table and, if greater electrical conductivity is desired, at least one additive selected from the group consisting of the elements of Group VB of the Periodic Table have, as mentioned previously, non-ohmic characteristics. For non-ohmic devices using $TiO_2$, the elements of Group IIA are present in an amount greater than 0.0 and generally less than 1.0 mole percent. The preferred additives are those elements with an ionic radius greater than that of titanium. These additives include calcium, strontium and barium. The latter element has an ionic radius of approximately 1.35 Angstroms which is approximately 115 percent of the ionic radius of $Ti^{4+}$. In one preferred embodiment, the additive from Group IIA is barium and is present in an amount greater than 0.15 mole percent and less than or equal to 0.3 mole percent. This amount is greater than approximately 0.25 and less than approximately 0.5 weight percent.

If desired, the electrical conductivity of the device may be increased with an additive selected from the elements of Group VB of the Periodic Table present in an amount generally less than 5.0 mole percent of the total composition. These elements include vanadium, niobium, and tantalum. These elements all produce nonohmic characteristics but are less effective in so doing than the elements selected from Group IIA. However, since vanadium may have a valence of 2+, 3+, 4+ or 5+ and vanadium oxides have a relatively high vapor pressure, it is difficult to both control the vanadium valence and to process the ceramic material at high temperature. Vanadium is, therefore, less preferred as the Group VB additive. In another preferred embodiment, the additives are barium, as previously described, and niobium which is present in an amount between 0.3 and 0.8 mole percent. This amount of niobium is between approximately 0.35 and 0.9 weight percent.

Compositions within the above preferred ranges have been found especially useful for low voltage varistors. For example, devices were made in which the direct current voltage required to pass 10 mA was between 8.9 and 10.7 volts, and the direct current voltage required to pass 1 mA was a minimum of 4.7 volts. These devices have a value of α greater than 2.8. Devices which satisfy this criterion have a barium content greater than approximately 0.2 mole percent and less than approximately 0.3 mole percent and a niobium content greater than approximately 0.4 mole percent and less than approximately 0.7 mole percent. This corresponds to a barium content between 0.35 and 0.5 weight percent and a niobium content between 0.45 and 0.8 weight percent.

As a further example, devices were also made in which the direct current required to pass 100 mA was between 7.2 and 8.7 volts, and the direct current voltage required to pass 1 mA was a minimum of 1.6 volts. These devices have a value of α greater than 2.72. Devices which satisfy this criterion have a barium content greater than approximately 0.15 mole percent and less than approximately 0.3 mole percent and a niobium content greater than 0.35 mole percent and less than approximately 0.75 mole percent. This corresponds approximately to a barium content between 0.25 and 0.5 weight percent and a niobium content between 0.4 and 0.85 weight percent.

Other Group IIA elements yield $TiO_2$ varistor devices useful at other voltages. For example, a device having 0.2 mole percent Sr and 0.5 mole percent Nb had a value of α of 3.2 between 25 and 28 volts. This is approximately 0.2 and 0.5 weight percent Sr and Nb, respectively. A device having 0.2 mole percent Sr and 0.5 mole percent Ta had a value of α of 3.3 at 25 volts. This is approximately 0.2 and 1.1 weight percent Sr and Ta, respectively.

Numerous other ceramic materials may be made with the method of this invention. For example, $BaTiO_3$ may be made with various additives to produce desirable characteristics. In particular, the Curie temperature may be shifted to a lower value by the addition of strontium and to a higher value by the addition of lead. As another example, several additives, such as dysprosium, antimony and niobium, may be added to reduce grain size to less than 1 micron and thus increase the dielectric constant. Sintering will generally be performed in oxygen. Magnesium may be added, in an amount that is typically 0.3 weight percent, to densify the $Al_2O_3$ for sodium lamp arc chambers. Sintering will generally be performed in hydrogen. Further, bismuth may be added to ZnO in an amount typically less than 1 mole percent to produce varistors.

We claim:

1. A method of preparing ceramic material selected from the group consisting of $TiO_2$, ZnO, $Al_2O_3$ and $BaTiO_3$ having at least one additive selected from the group consisting of the elements of Group IIA of the Periodic Table and at least one additive selected from the group consisting of the elements of Group VB of the Periodic Table comprising the steps of forming a slurry of said ceramic material, said slurry further comprising a dispersant said slurry having said at least one Group IIA additive and said Group VB additive in solution; precipitating said additives;
spray drying said slurry and precipitated additives.

2. A method as recited in claim 1 in which said Group IIA additive and Group VB additives form 10 weight percent or less of said ceramic material.

3. A method as recited in claim 2 in which said ceramic material is $TiO_2$.

4. A method as recited in claim 3 in which said Group IIA additive is barium.

5. A method as recited in claim 4 in which said barium additive is present in an amount less than 1.0 mole percent.

6. A method as recited in claim 5 in which said barium additive is present in an amount greater than 0.15 mole percent and less than 0.3 mole percent.

7. A method as recited in claim 6 in which said Group VB element is present in an amount less than 5 mole percent.

8. A method as recited in claim 4 or 7 in which said additive selected from Group VB is niobium, said niobium being present in an amount greater than 0.3 mole percent and less than 0.8 mole percent.

9. A method as recited in claim 8 comprising the further step of sintering.

10. A method as recited in claim 9 in which said sintering is at a temperature between 1350 degrees and 1450 degrees C.

11. A method as recited in claim 10 in which said sintering is in an atmosphere with an oxygen partial pressure greater than $10^{-5}$ atmosphere.

12. A method as recited in claim 8 in which said additives are barium nitrate and niobium oxalate.

13. A method as recited in claim 12 in which said precipitating step comprises adding ammonium sulfate and ammonium hydroxide to said slurry.

* * * * *